(12) United States Patent
Bennett

(10) Patent No.: US 7,257,529 B2
(45) Date of Patent: Aug. 14, 2007

(54) APPARATUS AND METHOD FOR AN AUTOMATED GRAMMAR FILE EXPANSION TOOL

(75) Inventor: Steven M. Bennett, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1062 days.

(21) Appl. No.: 09/951,338

(22) Filed: Sep. 10, 2001

(65) Prior Publication Data

US 2003/0050772 A1 Mar. 13, 2003

(51) Int. Cl.
G06F 17/27 (2006.01)
G06F 17/28 (2006.01)
G06F 17/20 (2006.01)
G10L 15/18 (2006.01)

(52) U.S. Cl. .............................. 704/9; 704/10; 704/257
(58) Field of Classification Search .................... 704/1, 704/7, 9, 275, 10, 246, 254, 257; 707/3, 707/5; 370/252
See application file for complete search history.

(56) References Cited

U.S. PATENT DOCUMENTS

| | | | | | |
|---|---|---|---|---|---|
| 5,029,162 | A | * | 7/1991 | Epps | 370/252 |
| 5,642,519 | A | * | 6/1997 | Martin | 704/9 |
| 5,937,385 | A | * | 8/1999 | Zadrozny et al. | 704/257 |
| 5,995,918 | A | * | 11/1999 | Kendall et al. | 704/1 |
| 6,173,251 | B1 | * | 1/2001 | Ito et al. | 704/7 |
| 6,173,261 | B1 | * | 1/2001 | Arai et al. | 704/257 |
| 6,336,214 | B1 | * | 1/2002 | Sundaresan | 717/143 |
| 6,374,226 | B1 | * | 4/2002 | Hunt et al. | 704/275 |
| 6,434,523 | B1 | * | 8/2002 | Monaco | 704/257 |
| 6,684,183 | B1 | * | 1/2004 | Korall et al. | 704/9 |
| 6,704,728 | B1 | * | 3/2004 | Chang et al. | 707/5 |
| 6,711,561 | B1 | * | 3/2004 | Chang et al. | 707/3 |
| 2002/0099535 | A1 | * | 7/2002 | Schmid et al. | 704/4 |
| 2002/0156616 | A1 | * | 10/2002 | Russell | 704/4 |

OTHER PUBLICATIONS

Kupiec, Julian, "Robust part-of-speech tagging using a hidden Markov model", *Computer Speech and Language*, (1992), 6, pp. 225-242.
Jurafsky, Daniel and Martin, James H., "Speech and Language Processing An Introduction to Natural Language Processing, Computational Linguistics, and Speech Recognition", Prentice-Hall, Inc., 2000, Table of Contents.
Dougherty, Prof. Ray C., "Universal Grammar in Prolog", http://www.nyu.edu/pages/linguistics/ling.html.
McConnel, Stephen, "PC-PATR Reference Manual", Alpha test version 0.97a9 of Oct. 30, 1995, http://www.sil.org/pcpatr/manual/pcpatr.html.

* cited by examiner

*Primary Examiner*—Tālivaldis Nars Smits
*Assistant Examiner*—Abdelali Serrou
(74) *Attorney, Agent, or Firm*—Blakely, Sokoloff, Taylor & Zafman LLP

(57) ABSTRACT

An apparatus and method for an automated grammar file expansion tool are described. The method includes the receipt of a source grammar file. Once received, one or more grammar rules within the source grammar file are expanded to generate one or more expanded grammar rules. Once expanded, the one or more expanded grammar rules are provided to a grammar developer, for example, via a graphical user interface. Finally, a final grammar file is generated, including functionality of each grammar rule within the source grammar file, as well as one or more expanded grammar rules selected by the grammar developer from the expanded grammar rules.

31 Claims, 12 Drawing Sheets

Synonym Expanded Grammar Rules and Corresponding Synonym Rule(s)
public<meeting>= Schedule<Event>on<Day>with<Friend>
   <Event> = an appointment/a meeting
   ••• [OK] [CANCEL]

Statement Expanded Grammar Rules
public<meeting>=Schedule<Event>with<Friend>on<Day> | Schedule <Event> on <Day> with <Friend>
   ••• [OK] [CANCEL]

GRAMMAR DEVELOPER GUI 270

FIG. 4

APPARATUS AND METHOD FOR AN AUTOMATED GRAMMAR FILE EXPANSION TOOL

FIELD OF THE INVENTION

The invention relates generally to the field of speech recognition. More particularly, the invention relates to a method and apparatus for an automated grammar file expansion tool.

BACKGROUND OF THE INVENTION

Development of a speech-based interface for most computer applications requires a grammar developer to define the phrases that a user may utter during his/her interactions with the computer application. These phrases are expressed in a grammar file, which is fed to a speech recognition component of the speech recognition system when the application is active. The constituent elements of the grammar file are called grammar rules. Grammar files are commonly expressed in a form like Backus-Naur Form (BNF) or the Java Speech Grammar Format (JSGF). An example grammar file (using a simplified syntax close to JSGF) is shown below:
public <Meeting>=Schedule a meeting on <Day>with <Friend>
<Day>=Tuesday |Thursday
<Friend>=Fred |Jack This grammar file describes the following phrases:
Schedule a meeting on Tuesday with Fred
Schedule a meeting on Tuesday with Jack
Schedule a meeting on Thursday with Fred
Schedule a meeting on Thursday with Jack These grammar rules use three non-terminal symbols (<Meeting>, <Day> and <Friend>) and nine terminal symbols ("Schedule", "a", "meeting", "on", "with", "Tuesday", "Thursday", "Fred" and "Jack").

Now suppose that the user of an application employing this grammar file uttered the following: "schedule an appointment on Thursday with Jack". The collection of grammar rules shown above would not recognize the utterance since it fails to match any of the phrases listed above. Consequently, in order to provide a more natural interface to the user, the grammar developer is required to expand the grammar rules as shown below:
public <Meeting>=Schedule <Event> on <Day> with <Friend>
<Event>=an appointment|a meeting
<Day>=Tuesday|Thursday
<Friend>=Fred|Jack In the expansion described above, a terminal symbol group ("a meeting") is selected from the grammar rule "public <Meeting>= . . . ". Accordingly, "a meeting" is synonym expanded to generate a new grammar rule: "<Event>= . . . " In this case, "an appointment" and "a meeting" are synonymous and are included in the new grammar rule. The modified version of the original grammar rule ("public <Meeting> . . . ") is referred to as a synonym expanded grammar rule. In addition, the new grammar rule is referred to as a synonym rule, while the non-terminal in the synonym rule ("<Event>") is referred to as the synonym rule non-terminal. This synonym expansion now enables the grammar file to recognize the user's utterance.

However, suppose that the user uttered the following: "Schedule a meeting with Jack on Thursday". The grammar rules shown above would not recognize this utterance. Consequently, the grammar rules requires expansion as follows:
public <Meeting>=Schedule <Event> on <Day> with <Friend>
|Schedule <Event> with <Friend> on <Day>
<Event>=an appointment|a meeting
<Day>=Tuesday|Thursday
<Friend>=Fred|Jack In this example, groups of terminal and non-terminal components in the original rule can be reordered, while retaining the meaning of the original rule. To determine just which terminal or non-terminal components can be reordered, the grammar developer must analyze the language being used and study the way that users interact with the system in order to make changes accordingly. In this case, two prepositional phrases were reordered. The modified version of the original grammar rule ("public <Meeting> . . . ") is referred to as a statement expanded grammar rule. Accordingly, the expansion process in this example is referred to as statement expansion. However, many other forms of expansion are possible.

Synonym and statement expansion of the initial grammar rule have resulted in quite a complex expanded grammar file, in spite of the fact that expansions were performed for only two simple cases. Nevertheless, current tools for grammar development force the application/grammar developer to address these issues manually. Unfortunately, this is a time consuming process. In addition, manual expansion is error prone and renders maintenance and debug of the resulting grammar files difficult. Therefore, there remains a need to overcome one or more of the limitations described above.

BRIEF DESCRIPTION OF THE DRAWINGS

The present invention is illustrated by way of example, and not by way of limitation, in the figures of the accompanying drawings and in which:

FIG. 4 depicts a block diagram illustrating a grammar developer graphical user interface in accordance with the further embodiment of the present invention.

DETAILED DESCRIPTION

Figure 1:
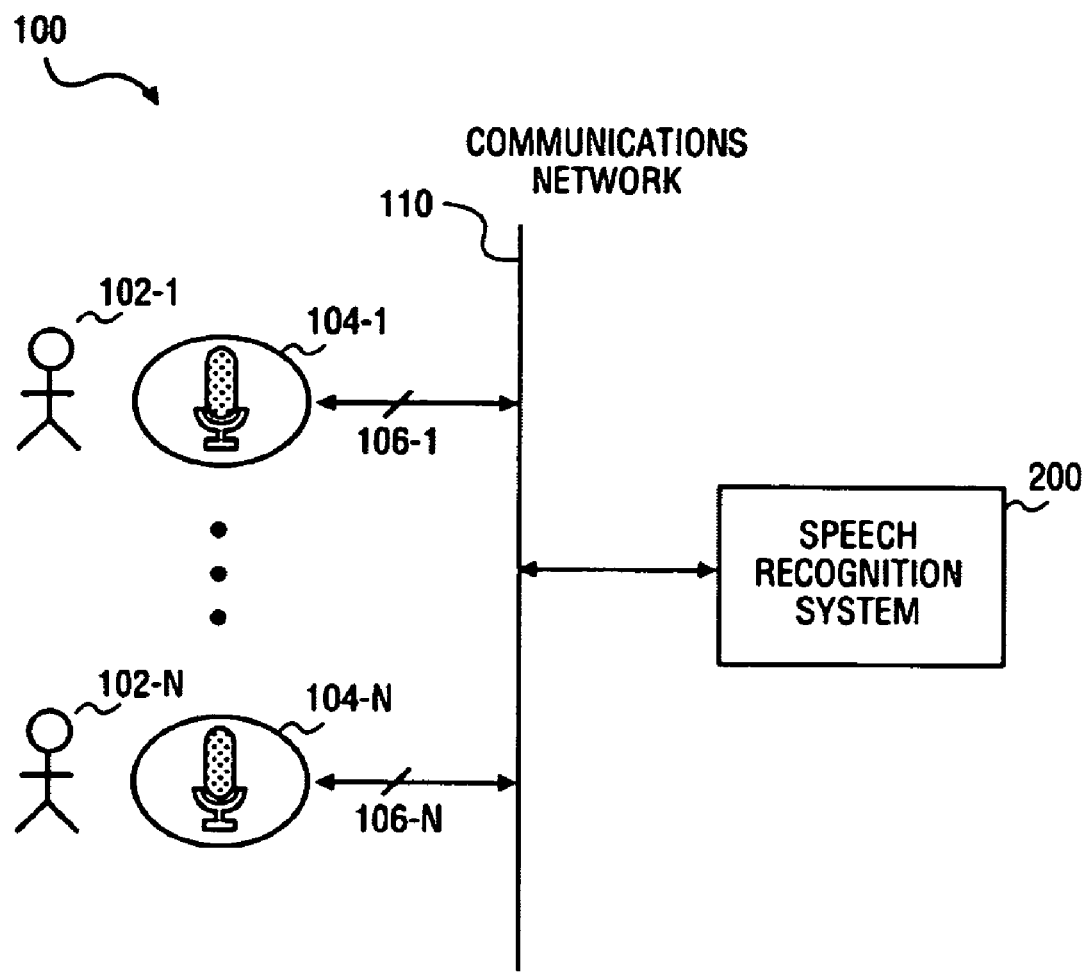
FIG. 1 depicts a block diagram illustrating a speech recognition system in which the teachings of the present invention may be implemented.

A method and apparatus for an automated grammar file expansion tool are described. The method includes the receipt of a source grammar file including one or more grammar rules. Once received, one or more grammar rules within the source grammar file may be expanded to generate one or more expanded grammar rules. In one embodiment, the expanded grammar rules may be created through statement expansion or synonym expansion. Expanded grammar rules created through synonym expansion include synonym rules and synonym expanded grammar rules. In addition, expanded grammar rules created through statement expansion are referred to herein as statement expanded grammar rules. Once expanded, the one or more expanded grammar rules are provided to a grammar developer, for example, via a graphical user interface.

In one embodiment, a final grammar file is generated, including functionality of each grammar rule within the source grammar file as well as one or more expanded grammar rules selected by the grammar developer from the one or more expanded grammar rules. In one embodiment, the grammar rules selected for inclusion by the grammar developer may be statement expanded grammar rules or synonym expanded grammar rules together with associated synonym rules.

Accordingly, as described herein, reference is made to statement expanded grammar rules and synonym expanded grammar rules together with associated synonym rules, which are collectively referred to as expanded grammar rules. However, expansion of grammar rules is not limited to synonym and statement expansion. In one embodiment, expansions may add or remove greetings, interjections or politeness markers. In an alternate embodiment, expansions may add or remove negatives and modify verb phrases accordingly. Grammar rules created through any form of expansion are referred to herein as expanded grammar rules. Therefore, no limitation is placed on the specific forms of expansion employed herein.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine/computer-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System Architecture

FIG. 1 illustrates a system 100 in which the teachings of the present invention may be implemented. The system 100 includes a number of speech transmission mediums 104 (104-1, ..., 104-N) and a speech recognition system 200 in communication via a communications network 110. In one embodiment, the speech recognition system 200 receives speech data 106 (106-1, ..., 106-N) from one or more users 102 (102-1, ..., 102-N). The speech data 106 is provided by a user 102 via the speech transmission medium 104 arid received by the speech recognition system 200 via the communications network 110.

The communications network 110 generally refers to any type of wire or wireless link enabling the transmission of speech data such as, but not limited to, a public switch telephone network, a wireless communications network, a local area network, a wide area network or a combination of networks. The speech transmission medium 104 generally refers to any type of device capable of receiving speech from a user and providing the speech to a destination via a communications network such as the communications network 110.

In one embodiment of the present invention, the communications network is a public switch telephone network and the speech transmission medium is the telephone. However, it is within the contemplation of the present invention that the speech transmission medium is a microphone directly connected to the speech recognition system 200 such that the communications network 110 is, for example, a simple wire carrying an analog speech signal. However, it should be noted that analog speech data may be converted to a digital format within the speech recognition system 200, by, for example, the speech transmission medium 104, at any point along the communications network 110 or at the speech recognition system 200. Additionally, the speech recognition system 200 may be distributed in arbitrary ways, across a network.

Figure 2:
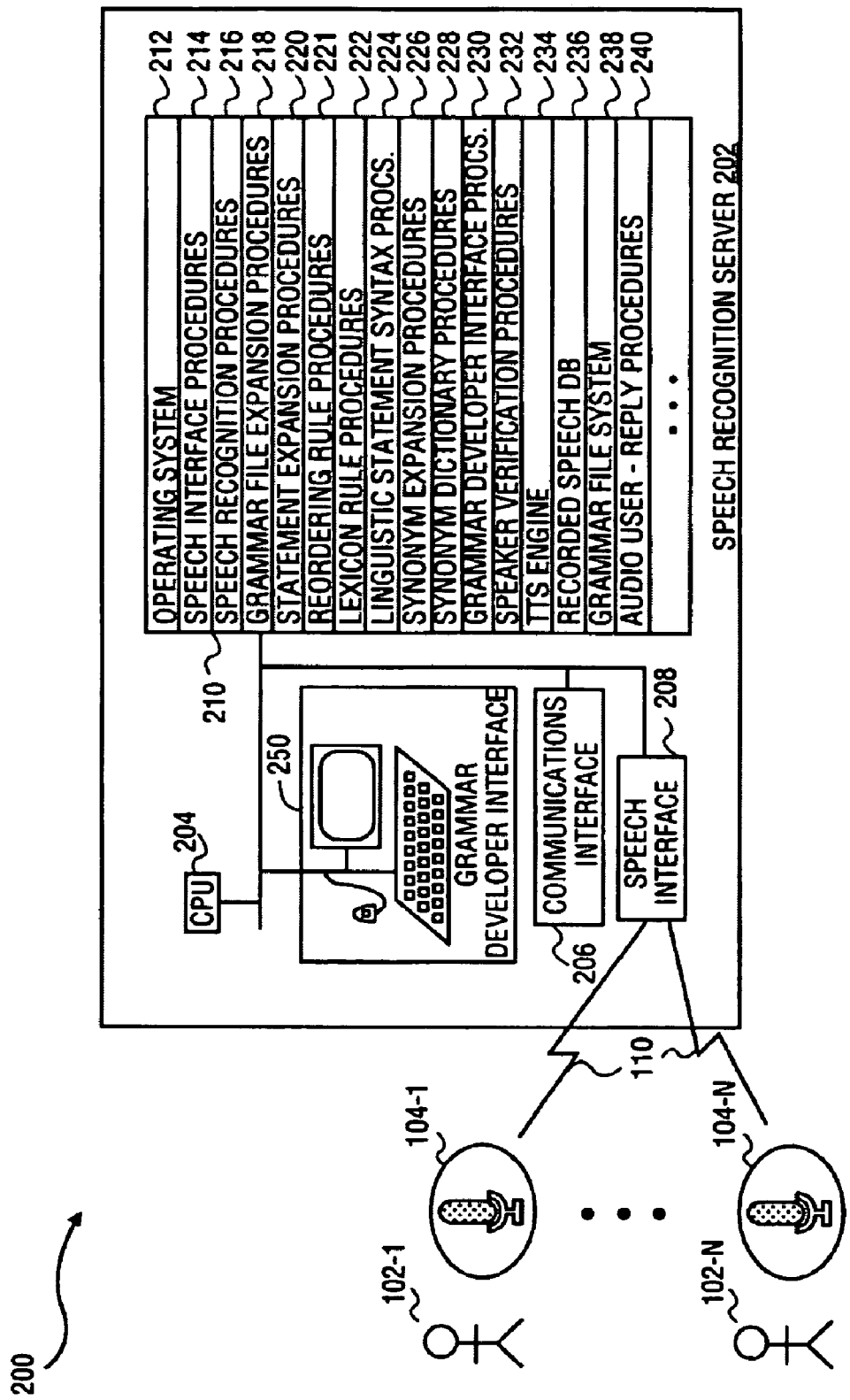
FIG. 2 depicts a block diagram further illustrating a speech recognition system server computer of the speech recognition system as depicted in FIG. 1 in accordance with an embodiment of the present invention.

Referring now to FIG. 2, FIG. 2 further illustrates the speech recognition system 200, including a server computer 202. The server 202 includes a central processing unit (CPU) 204, a grammar developer interface 250, a communications interface 206, a speech interface 208 and a memory 210. The speech recognition server computer 202 can be any type of computing device such as, but not limited to, handheld computers, cellular phones, desktop computers, workstations, laptops and/or mainframe computers. In addition, those skilled in the art will realize that the server computer 200 may include a plurality of computers working together to provide grammar file expansion functions as described in further detail below. The speech interface 208 is used to communicate with the users 102 as well as other system resources not shown, such as, for example, additional network connections that are not illustrated.

Accordingly, the speech interface 208 receives speech data 106 provided by a user 102 through a speech transmissions medium 104, which is provided over the communications network 110. The speech interface 208 provides digitized speech data to the server computer 202 and delivers digital or analog data from the speech recognition server computer 202 to the communication network 110 for interactive speech recognition, including speech processing, speech recognition and text-to-speech processing. The grammar developer interface 250 provides one or more expanded grammar rules including, for example, statement expanded grammar rules and synonym expanded grammar rules to a grammar developer, which may be selected for inclusion in a final grammar file. Therefore, the final grammar file will include the functionality of the grammar rules from the source grammar file, which are supplemented by expanded grammar rules selected by the grammar developer.

The memory 210 of the speech recognition server computer 200 may be implemented as volatile memory such as RAM (random access memory) or a combination of volatile and non-volatile memory, such as one or more memory modules, storage volumes, magnetic disk storage units, or the like. The memory can contain any of the following:

an operating system 212;
speech interface procedures 214 for receiving the speech data 106 from the user 102 via the speech interface 208;
speech recognition procedures 216 for processing the speech data 106 to determine a phrase recognized based on a currently active grammar file;
grammar file expansion procedures 218 which collectively include statement expansion procedures 220, reordering rule procedures 221, lexicon rule procedures 222, linguistic analysis procedures 224, synonym expansion procedures 226, synonym dictionary procedures 228 and grammar developer interface procedures 230; collectively the grammar expansion procedures 218 expand each grammar rule within a source grammar file to provide one or more expanded grammar rules which are provided to a grammar developer and based on a selection received from the grammar developer, a final source grammar file is generated including the functionality of the source grammar file supplemented by the expanded grammar rules selected by the grammar developer;
statement expansion procedures 220 for generating an internal rule representation of a selected grammar rule, reordering components of the selected grammar rule to form one or more internal statement expanded grammar rules, determining whether an internal statement expanded grammar rule retains a meaning of the original selected grammar rule, and when such is the case, storing the internal statement expanded grammar rule as a statement expanded grammar rule, in conjunction with the lexicon rule procedures 222, reorder rule procedures 221 and linguistic analysis procedures 224;
reordering rule procedures 221 for determining elements of the internal rule representation which may be reordered based on a set of reordering rules;
lexicon rule procedures 222 for expanding, in conjunction with the statement expansion procedures 220, a selected grammar rule into an internal rule representation;
linguistic analysis procedures 224, which function in conjunction with the lexicon rule procedures 222 and the statement expansion procedures 220 in order to determine whether an internal statement expanded grammar rule retains a meaning of the original selected grammar rule, and when such is the case, the internal statement expanded grammar rule is stored as a statement expanded grammar rule;
synonym expansion procedures 226 for selecting one or more components of a selected grammar rule and generating synonym expanded grammar rules and associated synonym rules for the one or more selected components utilizing the synonym dictionary procedures 228;
synonym dictionary procedures 228 which includes synonym dictionary functionality and part-of-speech analysis for analyzing the selected components in order to determine one or more synonyms for the selected component and forming a synonym rule;
grammar developer interface procedures 230 for providing the expanded grammar rules to a grammar developer and for receiving a selection from the grammar developer, of one or more of the expanded grammar rules and based on the received selection to form a final grammar file including the functionality of the source grammar file as well as each expanded grammar rule selected by the grammar developer, for example, via the grammar developer graphical user interface 270 as depicted in FIG. 4;
audio user-reply procedures 240 for providing audio responses from the speech recognition system 200 to the user 102;
speaker verification procedures 232 for verifying the identity of a user 102 providing speech data 104 to the speech recognition system 200;
a text-to-speech (TTS) engine 234 for converting text to audio utilized by the audio user reply procedures 230;
a recorded speech database 236 including digital audio utilized by the audio user-reply procedures 240;
a grammar file system 238 including expanded grammar files generated using the grammar file expansion procedures 218 and used by the speech recognition procedures 216 to process the speech data 106 provided by the user 102; and
other procedures and data structures.

Figure 3:
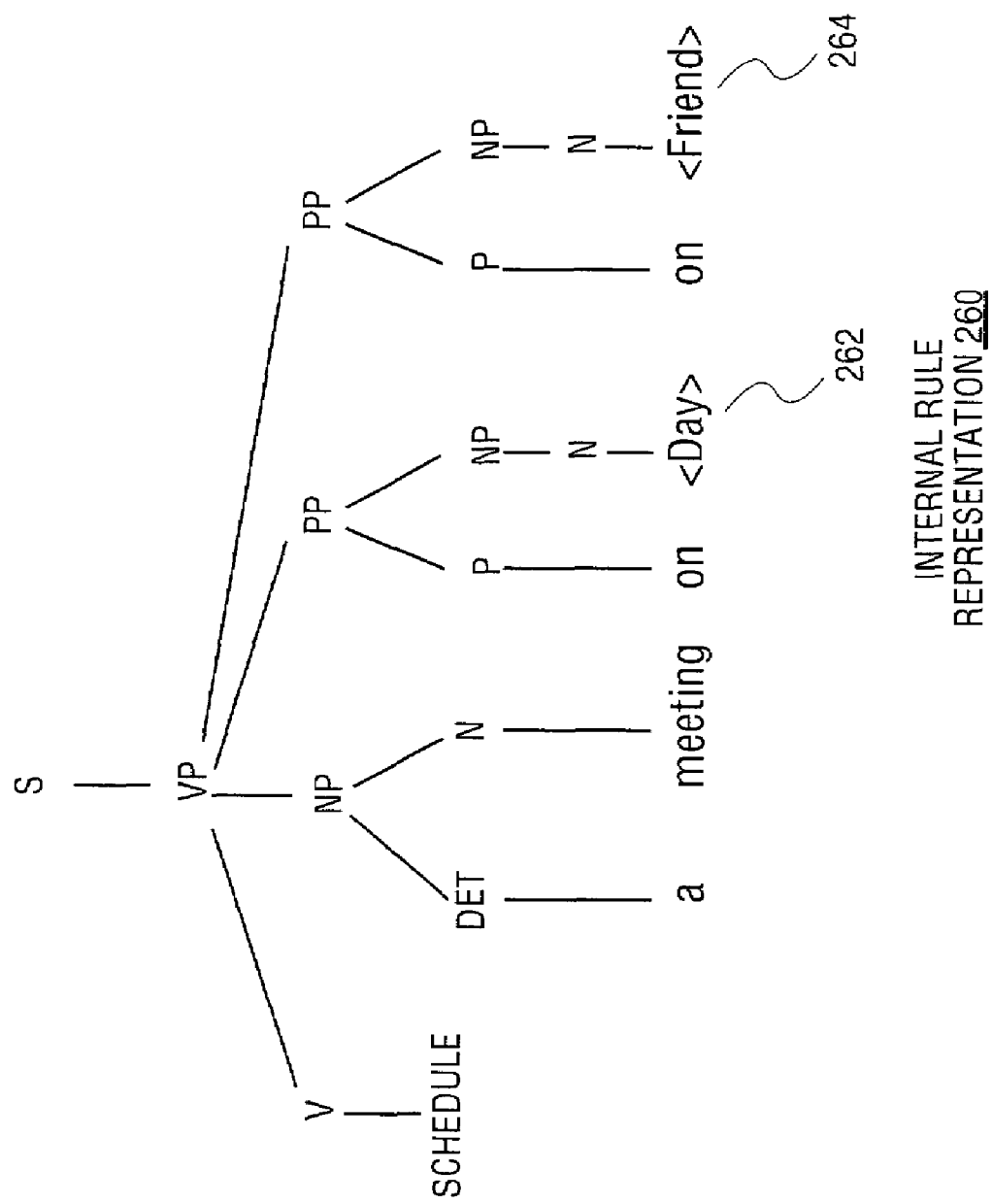
FIG. 3 depicts an internal rule representation of a grammar rule in accordance with a further embodiment of the present invention.

Referring now to FIG. 3, FIG. 3 depicts an internal rule representation 260, which is utilized by the grammar file expansion procedures 218 in order to perform expansion of a selected grammar rule within a source grammar file. As depicted in FIG. 3, the grammar rule, which appears in the background section "schedule a meeting on <Day> with <Friend>" is provided in an internal rule representation 260. As indicated, non-terminal components of the grammar rule are indicated within brackets: <Day> 262 and <Friend> 264, while the terminal components are not bracketed. The rule representation 260 also indicates parts of speech (such as "N" for noun or "V" for verb) and function within the sentence (such as "NP" for noun phrase, "VP" for verb phrase, "DET" for determinate, and "PP" for prepositional phrase).

The internal rule representation 260 may be, for example, a parse tree, built by dynamic programming algorithms such as the Earley or CYK algorithms or some other method. Many of these methods are driven from a context free grammar and lexicon. A simple context free grammar capable of parsing the example sentences may have the following form:
S->(NP) VP
VP->V NP (PP)*
NP->(ET) N
PP->P NP Additionally, the simple lexicon associates with these examples would be:
V->schedule
DET->a|an
N->meeting|appointment|Tuesday|Thursday|Jack|Fred
P->on|with However, those skilled in the art will recognize that this context free grammar and lexicon are greatly simplified from those of the actual system in order to avoid obscuring the details of the present invention. In addition, these examples are given as illustrations only and in no way limit the form or scope of the present invention.

The rule representation 260 may be utilized in order to reorder either terminal or non-terminal components of the grammar rule or some combination thereof in order to form one or more statement expanded grammar rules. This may be done through a variety of mechanisms of which two embodiments are presented.

In one embodiment, rule components are exhaustively reordered and each reordered rule is analyzed utilizing the linguistic analysis procedures 224 to determine if the reordered rule retains a meaning of the original grammar rule. If a meaning of the original grammar rule is retained by the reordered rule, the reordered rule is stored as a statement expanded grammar rule by the statement expansion procedures 220. This process is described below in greater detail.

In a further embodiment, the reorganization rule procedures 221 are utilized to determine allowed reorderings. The reorganization rule procedures 221 contain a number of reorganization rules which dictate allowed reorderings based on the constituent elements of the rule representation 260. For example, the rules may specify that successive prepositional phrases may be reordered:

$PP_1PP_2->PP_2PP_1$

In the example from the background section, "with <Friend>" and "on <Day>" are two such prepositional phrases and hence can be reordered. Note that while the complexity of these rules may be great, the present invention places no limitation on the complexity of the rules.

In addition, the rule representation 260 may be traversed by the synonym expansion procedures 226 in order to select components that may be converted into synonym expanded grammar rules and associated synonym rules utilizing the synonym dictionary procedures 228. In one embodiment, a synonym dictionary such as, for example, WordNet, in conjunction with a part-of-speech tagging mechanism such as, for example, PARTS or an HMM-based tagging mechanism, are utilized by the synonym dictionary procedures 228.

As described herein, candidates for synonym expansion are referred to as "components". However, it should be understood that candidates for synonym expansion might consist of more than one terminal component. For example, as illustrated in the background section, the component that was synonym expanded was "a meeting" which consists of two terminal components.

Referring now to FIG. 4, FIG. 4 depicts an embodiment of a grammar developer graphical user interface (GUI) 270 which lists synonym rule(s) 274, synonym expanded grammar rule(s) 276, as well as statement expanded grammar rule(s) 292, which collectively form the expanded grammar rules. Other embodiments may display other forms of expanded grammar rules or may not separate the different sources of rule expansion as illustrated in FIG. 4.

In the embodiment shown in FIG. 4, the grammar developer is provided the listing of one or more synonym rules 274 and can click on an "OK" button 280 in order to have the synonym rule 274 appear in a final grammar file along with the associated changes to the synonym expanded grammar rule 276. In addition, the grammar developer can also click an "OK" button 294 in order to select any statement expanded grammar rules 292 so that they may appear in a final grammar file generated in accordance with the teachings of the present invention utilizing the grammar developer interface procedures 230.

Figure 5:
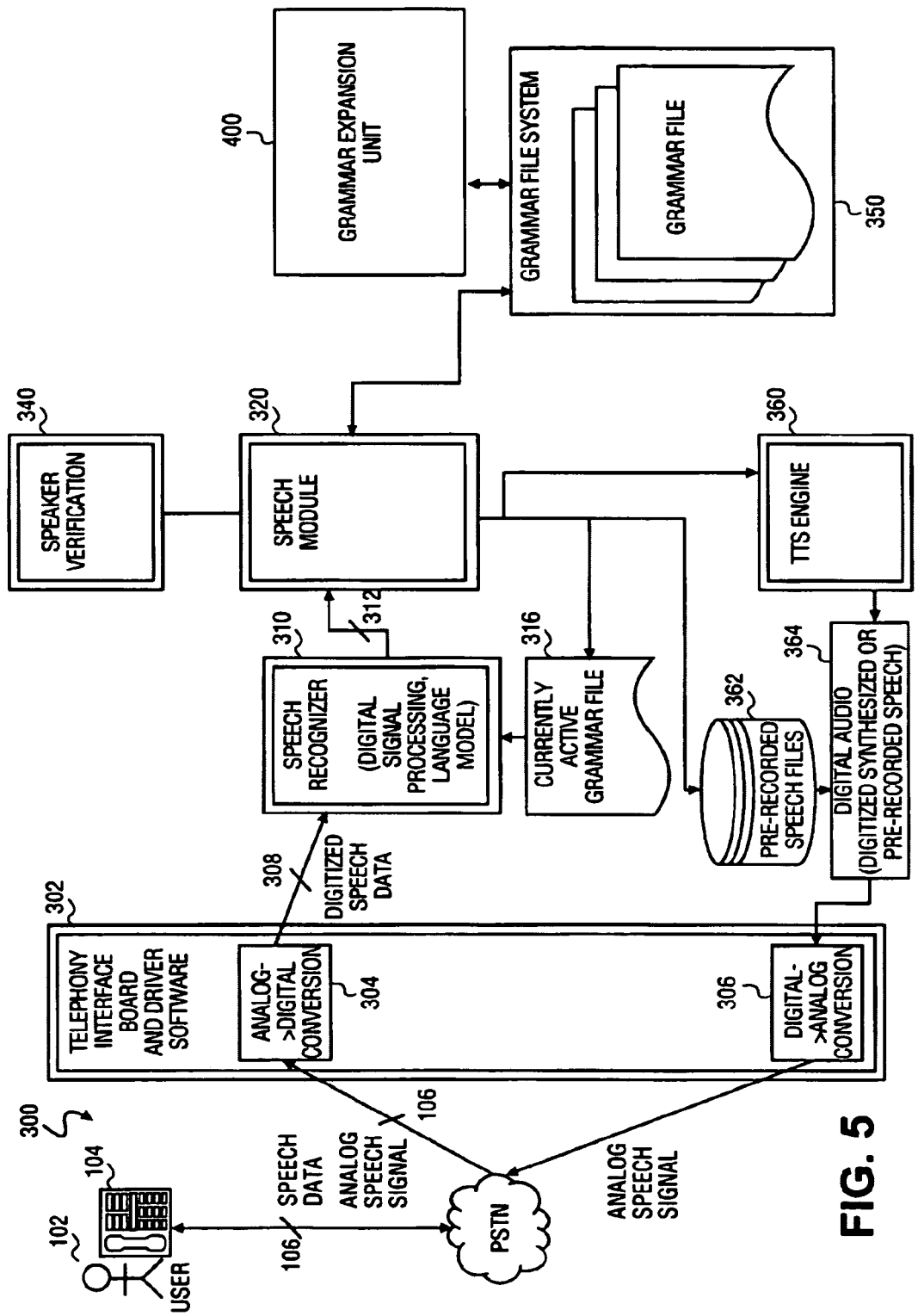
FIG. 5 depicts a block diagram illustrating a speech recognition system utilizing an expanded grammar file in accordance with a further embodiment of the present invention.

FIG. 5 illustrates a speech recognition system 300 in accordance with the teachings of the present invention for automated expansion of source grammar files to improve speech recognition. The speech recognition system 300 is a component hardware and software implementation of the speech recognition server computer 200, as depicted in FIG. 2, with the grammar file expansion procedures implemented as a grammar expansion unit 400. Accordingly, as described above, the grammar expansion unit 400 aids a graniniar developer in performing statement expansion and synonym expansion of one or more grammar rules from a source grammar file. The developer then selects one or more of the expanded grammar rules, which are combined with the functionality of the grammar rules from the source grammar file to form a final grammar file.

The speech recognition system 300 includes a speech interface board 302 that receives an analog speech signal 306 provided by a user 102 via a speech transmission medium (telephone) 104. The speech interface board 302 is preferably a telephone interface board and driver software as manufactured by the Dialogic® Corporation. However, the speech data 106 provided by the user 102 is not accepted by the speech recognition system 300 until the user 102 is verified by a speaker verification system 340. The speaker verification unit 340 is preferably a speaker verification unit as manufactured by T-Netix® Corporation. Analog speech data 106 is received via the public switch telephone network and is converted to digitized speech data 308 using an analog-to-digital conversion unit 304 which is part of the Dialogic telephony interface board. The digitized speech data 308 is then provided to a speech recognizer 310 (as described above).

The speech recognizer 310 processes the digitized speech data 308 based on a currently active recognition grammar 316. However, in order to improve speech recognition, the recognition grammar is first expanded using the grammar expansion unit 400. Once expanded, the speech recognizer will include various additional recognized phrases from which to match the speech data 308. In one embodiment, the speech recognizer 310 is, for example, a speech recognizer from Speech Works International®. Accordingly, the speech recognizer 310 analyzes the digitized speech data 308, matching it to phrases in the active grammar file 316. The matching phrase is provided to the speech module 320 in a form such as ASCII text 312.

Once this speech data is recognized, a speech module 320 can respond to the user using pre-recorded speech files 364 (which may be in the form of speech files, wave files or any other digital format) from a recorded speech database 362. Alternatively, dynamically generated digital audio from a text-to-speech (TTS) engine 360 may be used. The TTS engine 360 converts text to digital audio, which may be in the form of wave file or any other digital format. In one embodiment, the TTS engine 360 is manufactured by AT&T® Corporation. Procedural method steps for implementing the teachings of the present invention are now described.

However, those skilled in the art will recognize that FIG. 5 has not attempted to provide an exhaustive illustration of all paths over which information and control moves during system operation. Procedural method steps for implementing the teachings of the present invention are now described.

Operation

Figure 6:
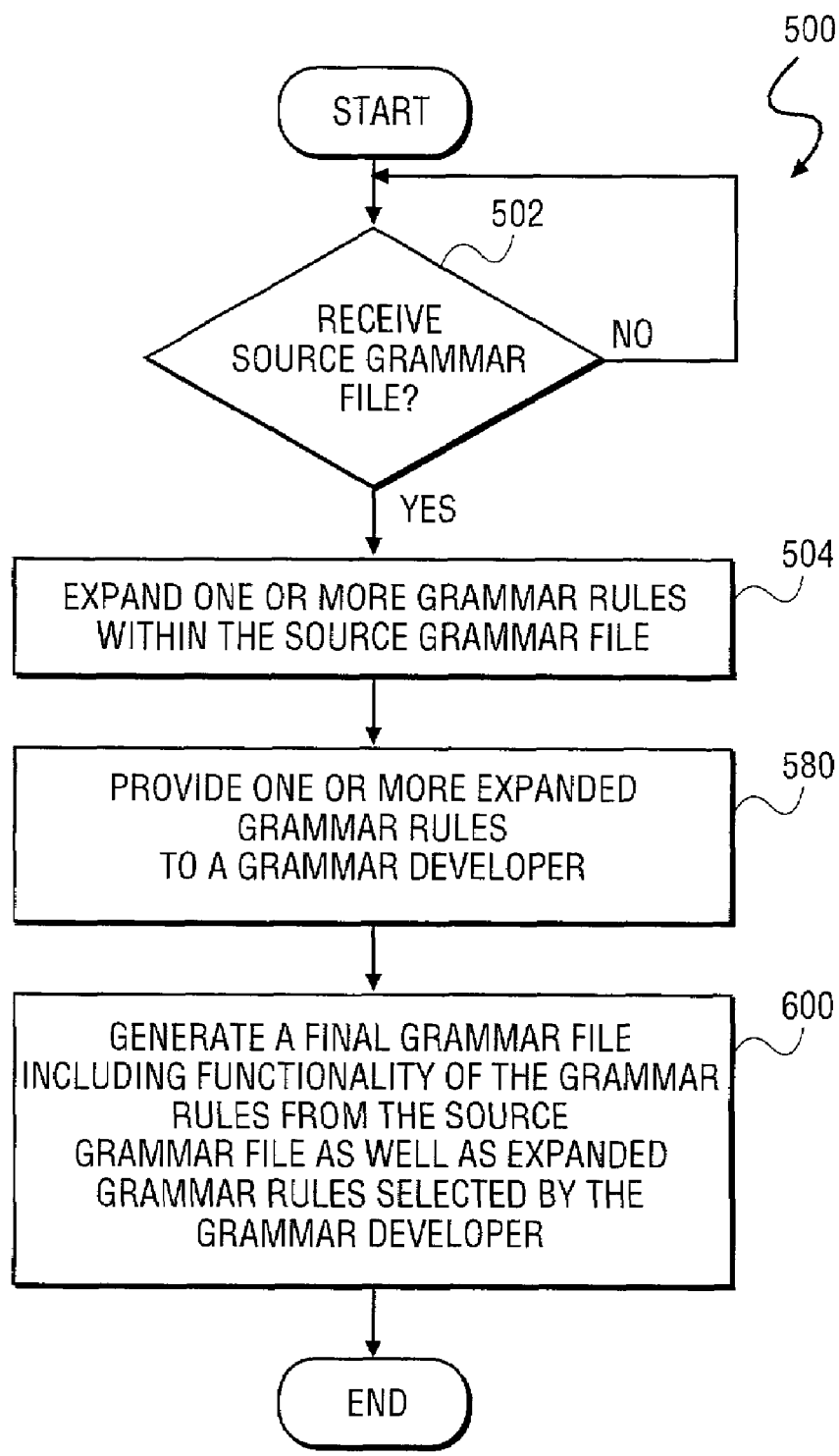
FIG. 6 depicts a flowchart illustrating a method for performing automated grammar file expansion in accordance with an embodiment of the present invention.

Referring now to FIG. 6, FIG. 6 depicts a flowchart illustrating a method 500 for automated expansion of a source grammar file, for example as illustrated with reference to FIGS. 1-5, in accordance with an embodiment of the present invention. At process block 502, it is determined whether a source grammar file is received from a grammar developer. Once received, process block 504 is performed. At process block 504, one or more grammar rules within the source grammar file are expanded using the grammar file expansion procedures 218, which collectively include procedures 220 through 230. As discussed above, the expanded grammar rules may include statement expanded grammar rules and synonym expanded grammar rules together with associated synonym rules.

Once the one or more grammar rules within the source grammar file are expanded, process block 580 is performed. At process block 580, the grammar developer interface procedures 230 provides the one or more expanded grammar rules to the grammar developer via, for example, the grammar developer GUI 270 as depicted in FIG. 4. In an embodiment, this includes the one or more statement expanded grammar rules and the one or more synonym expanded grammar rules and associated synonym rules. Finally, at process block 600, the grammar developer interface procedures 230 generate a final grammar file, including the functionality of the grammar rules within source grammar file as well as each expanded grammar rule selected by the grammar developer via the grammar developer GUI 270. Although the grammar rule expansion described above includes statement and synonym expansion, the expansion process at block 580 may include a wide variety of expansions methods, as discussed above, including, for example, statement expansion, synonym expansion, greeting, interjection and politeness modifications, verb sense and tense modifications, etc.

An alternate embodiment provides the expanded grammar rules to the grammar developer but does not generate a final grammar file, as described above. Additionally, another embodiment generates the final grammar file without providing the expanded grammar statements to the developer or requiring input from the developer.

Figure 7:
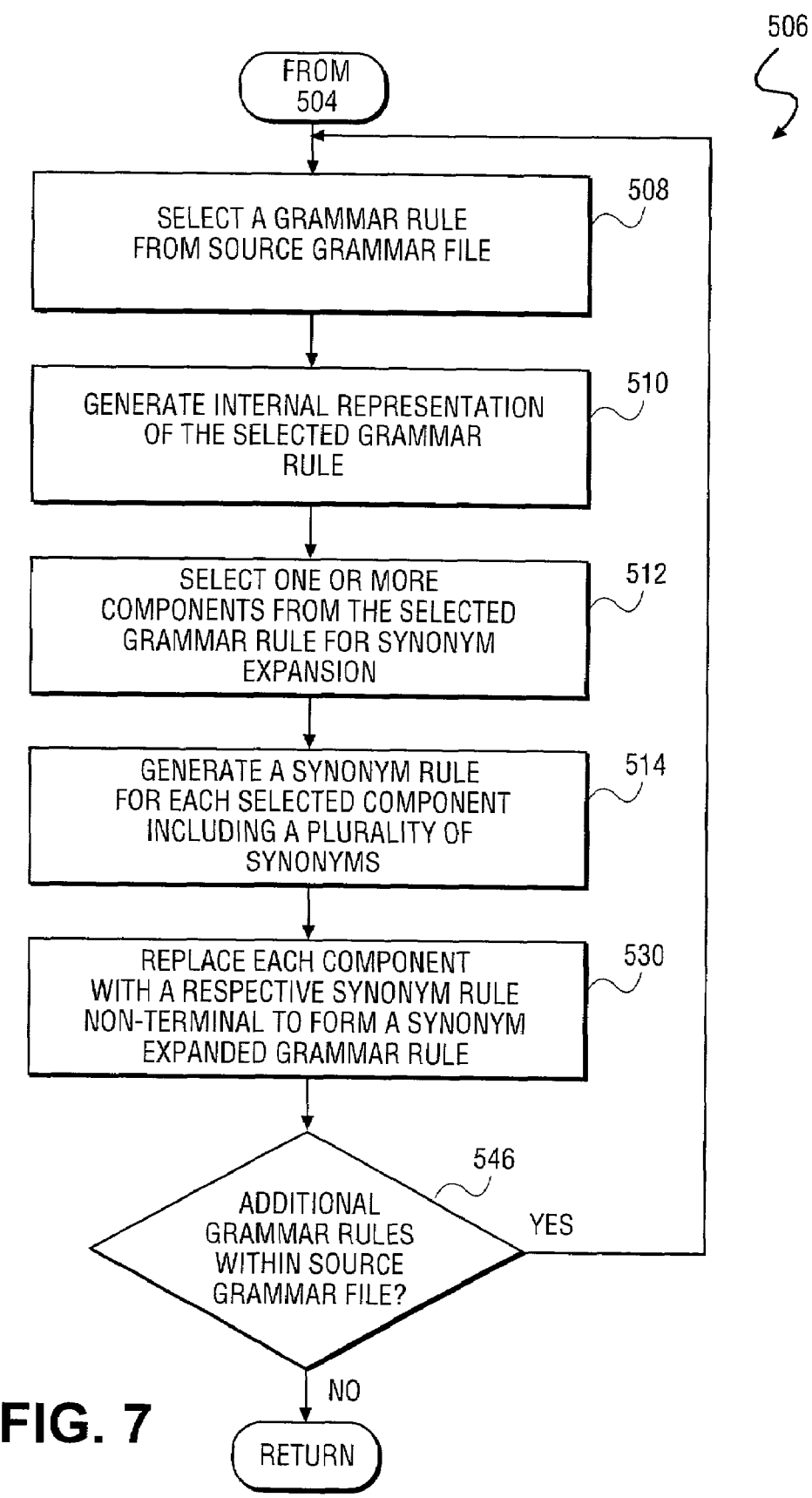
FIG. 7 depicts a flowchart illustrating an additional method for synonym expanding grammar rules within a source grammar file in accordance with a further embodiment of the present invention.

Referring now to FIG. 7, FIG. 7 depicts a flowchart illustrating an additional method 506 for expanding grammar rules within the source grammar file of process block 504 as depicted in FIG. 6. At process block 508, the grammar file expansion procedures 218 select a grammar rule from the source grammar file. This selection may be simple enumeration or based on a more sophisticated selection process. At process block 510, the statement expansion procedures 220 generate an internal representation of the selected grammar rule, for example, as depicted in FIG. 3. Next, at process block 512, the synonym expansion procedures 226 select one or more components from the selected grammar rule for synonym expansion. Again, this selection may be simple enumeration or based on a more sophisticated selection process. At process block 514, the synonym expansion procedures 226 generate a synonym rule for each selected component, each including a plurality of synonyms utilizing the synonym dictionary procedures 228.

In other words, the synonym dictionary procedures 228 are utilized to generate one or more synonyms for the selected component. A synonym rule is generated including the synonyms, as well as the original components. A synonym rule non-terminal names the synonym rule. In the example in the background section, the synonym rule non-terminal is "<Event>". Once each of the synonym rules are generated, process block 530 is performed. At process block 530, the synonym expansion procedures 226 replace each component in the selected grammar rule with a respective synonym rule non-terminal to form a synonym expanded grammar rule. Finally, at process block 546, process blocks 510-530 are repeated for each grammar rule within the source grammar file. Once processing of each grammar rule within the source grammar file is completed, control flow returns to process block 504 of FIG. 6.

Figure 8:
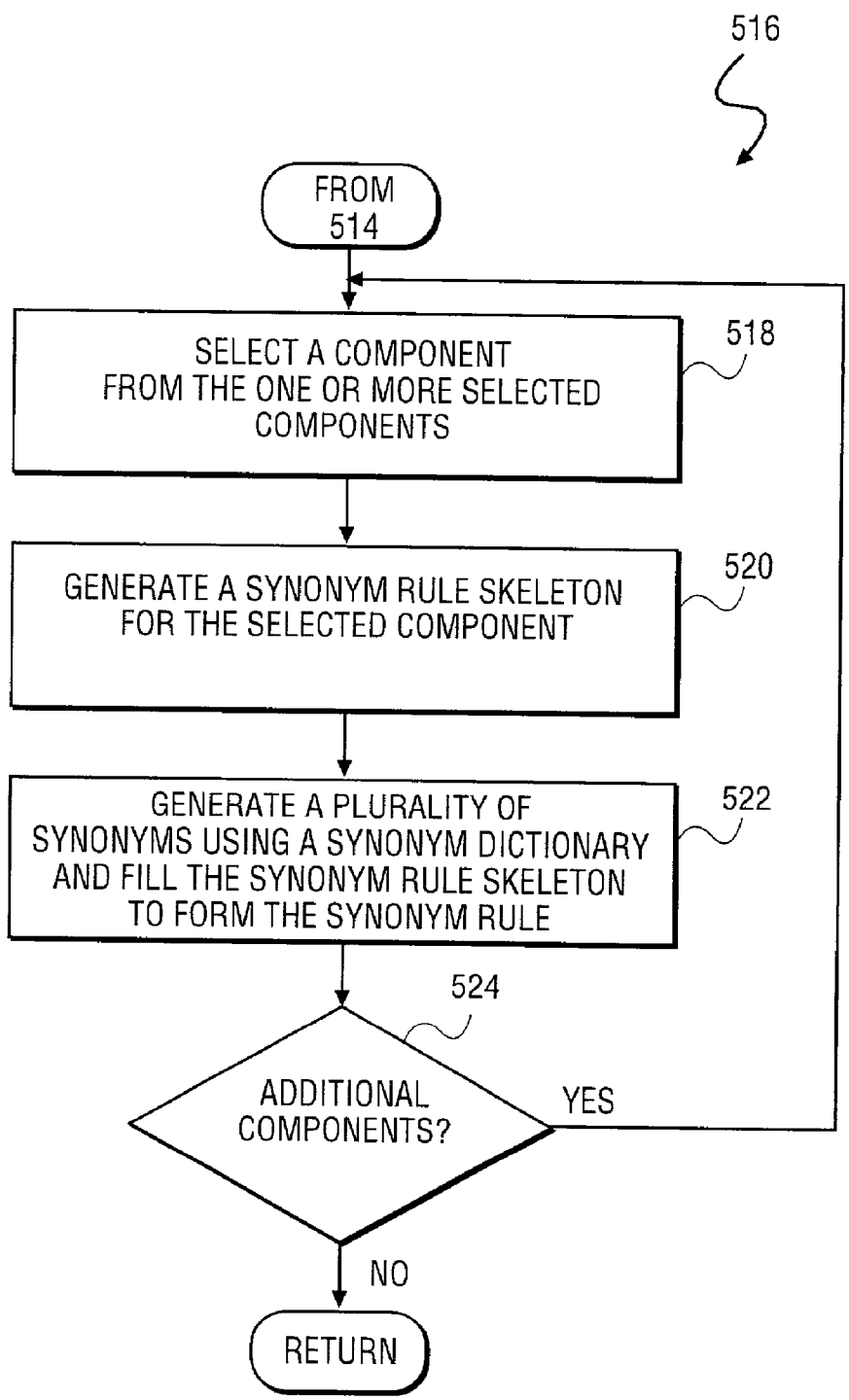
FIG. 8 depicts a flowchart illustrating an additional method for generating synonym rules in accordance with a further embodiment of the present invention.

Referring now to FIG. 8, FIG. 8 depicts a flowchart illustrating an additional method 516 for generating a synonym rule for each selected component of the selected grammar rule of process block 514 as depicted in FIG. 7. At process block 518, the synonym expansion procedures 226 select a component from the one or more selected components at process block 512 of FIG. 7. At process block 520, the synonym expansion procedures 226 generate a synonym rule skeleton for the selected component. In the example in the background section, the synonym rule skeleton is "<Event>=".

At process block 522, a plurality of synonyms are generated for the selected component using the synonym dictionary procedures 228 to fill the synonym rule skeleton and form the synonym rule. In the example in the background section, the synonym rule is "<Event>=a meeting|an appointment". Finally, at process block 524, process blocks 518-522 are repeated for each component selected at process block 512 of FIG. 7. Once each selected component is processed, control flow returns to process block 514 as depicted in FIG. 7.

Figure 9:
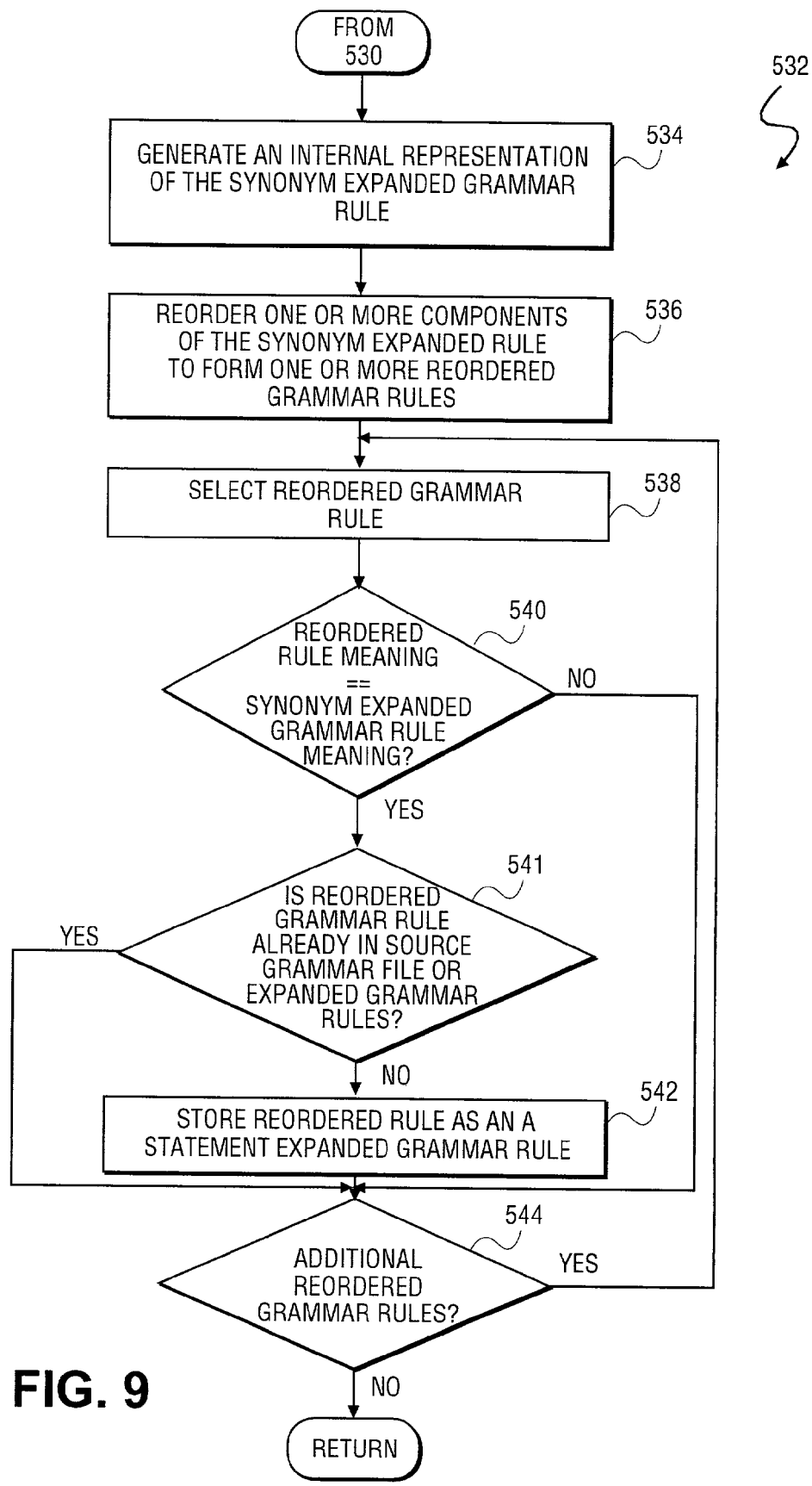
FIG. 9 depicts a flowchart illustrating an additional method for statement expansion of synonym expanded grammar rules in accordance with a further embodiment of the present invention.

Referring now to FIG. 9, FIG. 9 depicts a flowchart illustrating an additional method 532 for forming statement expanded grammar rules from the synonym expanded grammar rules of process block 530 as depicted in FIG. 7. At process block 534, the statement expansion procedures 220 generate an internal representation of the synonym expanded grammar rule of process block 530, for example as depicted in FIG. 3. At process block 536, one or more components of the synonym expanded grammar rule are reordered to form one or more reordered grammar rules. Alternatively, components are selected and reordered based on part of speech reordering rules, such as switching of prepositional phrases, verb phrases, noun phrases or the like.

At process block 538, a reordered grammar rule is selected. Once selected, at process block 540, it is determined whether the reordered grammar rule retains a meaning of the synonym expanded grammar rule. When the reordered grammar rule retains a meaning of the synonym expanded grammar rule, process block 541 is performed. Otherwise, control flow branches to process block 544. At process block 541, it is determined if the reordered grammar statement is already included in the source grammar file or expanded grammar rules. When the reordered grammar statement is not already included in the source grammar file or the expanded grammar rules, process block 542 is performed. Otherwise, control flow branches to process block 544.

At process block 542, the reordered grammar rule is stored as a statement expanded grammar rule. Finally, at process block 544, process blocks 534-542 are repeated for each of the one or more reordered components of the synonym expanded grammar rules. In one embodiment, the reordered components of the statement expanded grammar rule include both terminal and non-terminal elements, which may include synonym rule non-terminals. In alternative embodiments, the reordered components of the statement expanded grammar rule may be only terminal components or may include non-terminal components but not include synonym rule non-terminals.

Figure 10:
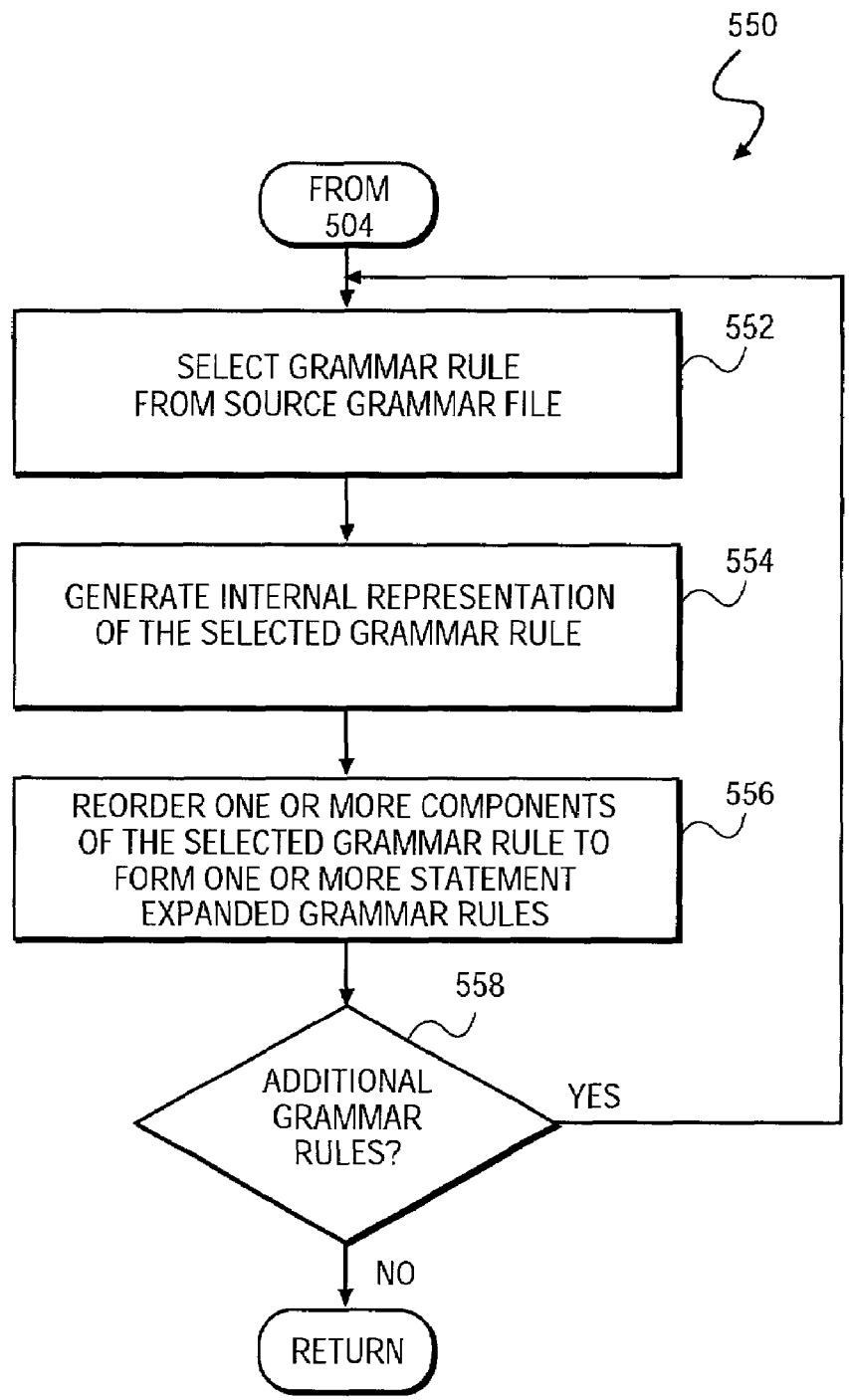
FIG. 10 depicts a flowchart illustrating an additional method for statement expanding grammar rules within a source grammar file in accordance with a further embodiment of the present invention.

Referring now to FIG. 10, FIG. 10 depicts a flowchart illustrating an additional method 550 for expanding grammar rules within the source grammar file of process block 504 as depicted in FIG. 6. At process block 552, the statement expansion procedures 220 select a grammar rule from the source grammar file. At process block 554, an internal representation of the selected grammar rule is generated. At process block 556, one or more components of the selected grammar rule are reordered to form one or more expanded grammar rules. Finally, at process block 558, process blocks 552-556 are repeated for each grammar rule within the source grammar file. Once processed, control flow returns to process block 504 as depicted in FIG. 6.

Figure 11:
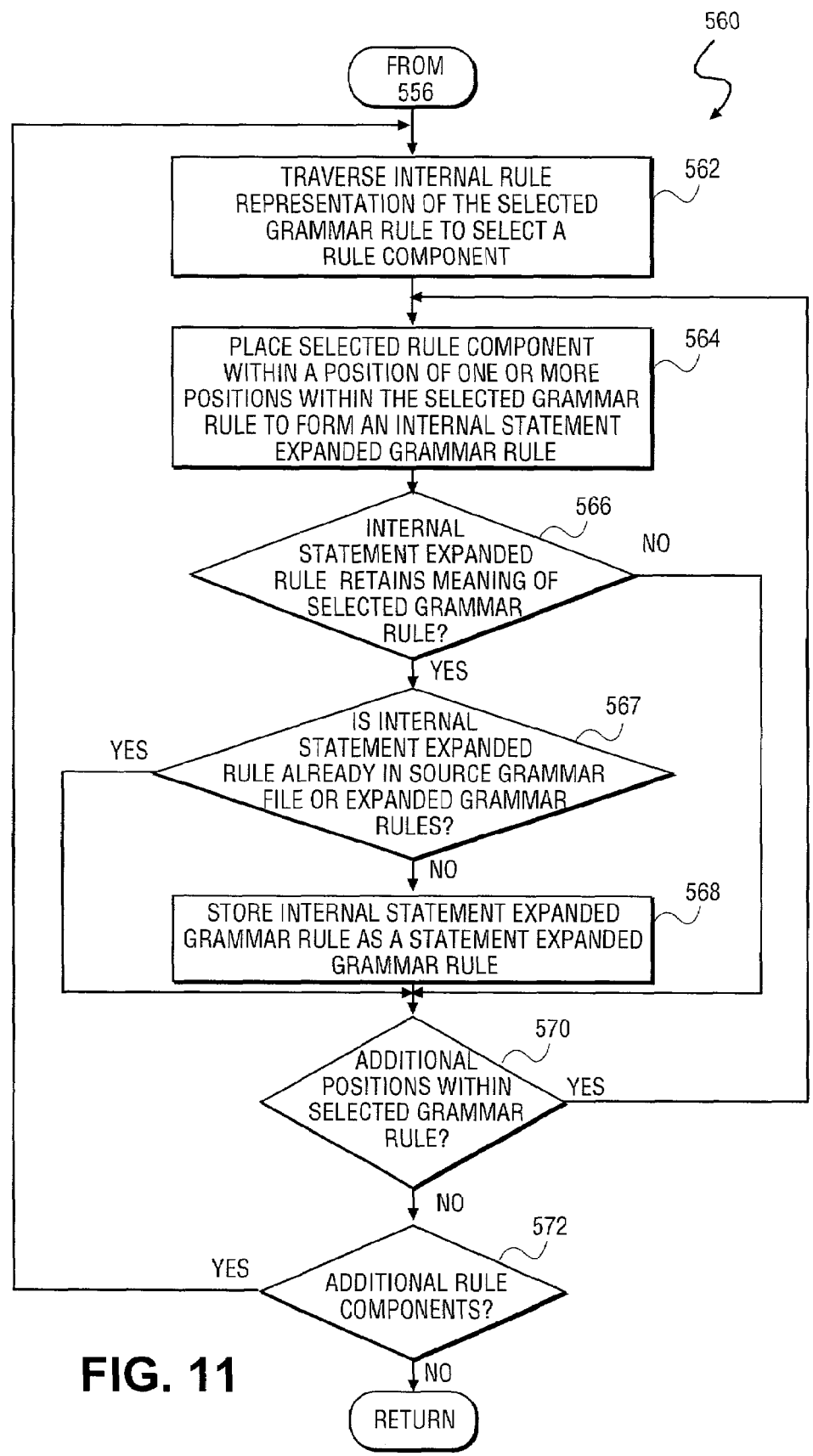
FIG. 11 depicts a flowchart illustrating an additional method for reordering components of a selected grammar rule in order to form one or more statement expanded grammar rules in accordance with a further embodiment of the present invention.

Referring now to FIG. 11, FIG. 11 depicts a flowchart illustrating an additional method 560 for reordering the one or more components of the selected grammar rule of process block 556 as depicted in FIG. 10. At process block 562, the statement expansion procedures 220 traverse the internal rule representation of the selected grammar rule to select a rule component. In one embodiment, selected components are limited to noun and verb components of the selected grammar rule. In other embodiments, the components reordered may arbitrarily complex and contain all forms of constituents. Once selected, at process block 564, the component is placed within a position of one or more positions within the selected grammar rule to form an internal statement expanded grammar rule. Once formed, at process block 566 it is determined whether the internal statement expanded grammar rule retains a meaning of the selected grammar rule utilizing the linguistic analysis procedures 224.

Accordingly, when the internal statement expanded grammar rule retains a meaning of the selected grammar rule from the source grammar file, process block 567 is performed. Otherwise, control flow branches to process block 570. At process block 567, it is determined if the internal statement expanded grammar statement is already included in the source grammar file or expanded grammar rules.

When the internal statement expanded grammar statement is not already included in the source grammar file or the expanded grammar rules, process block 568 is performed. Otherwise, control flow branches to process block 570.

Next, at process block 568, the internal statement expanded grammar rule is stored as a statement expanded grammar rule utilizing the statement expansion procedures 220. Next, at process block 570, process blocks 564-568 are repeated for each position within the selected grammar rule. Finally, at process block 572, process blocks 562-570 are repeated for each rule component of the selected grammar rule. Once processed, control flow returns to process block 556 as depicted in FIG. 10.

In another embodiment, the reordering may be driven through a set of rules which specify appropriate conditions under which reordering can occur. As discussed above, they may, for example, indicate that two prepositional phrases seen in succession may be reordered while retaining the same meaning as the original rule. These rules may be of arbitrary complexity and may be dependent on the form of the internal representation of the grammar rule. As recognized by those skilled in the art, the present invention places no limitation on the form of the rules used to enable the reordering process.

Figure 12:
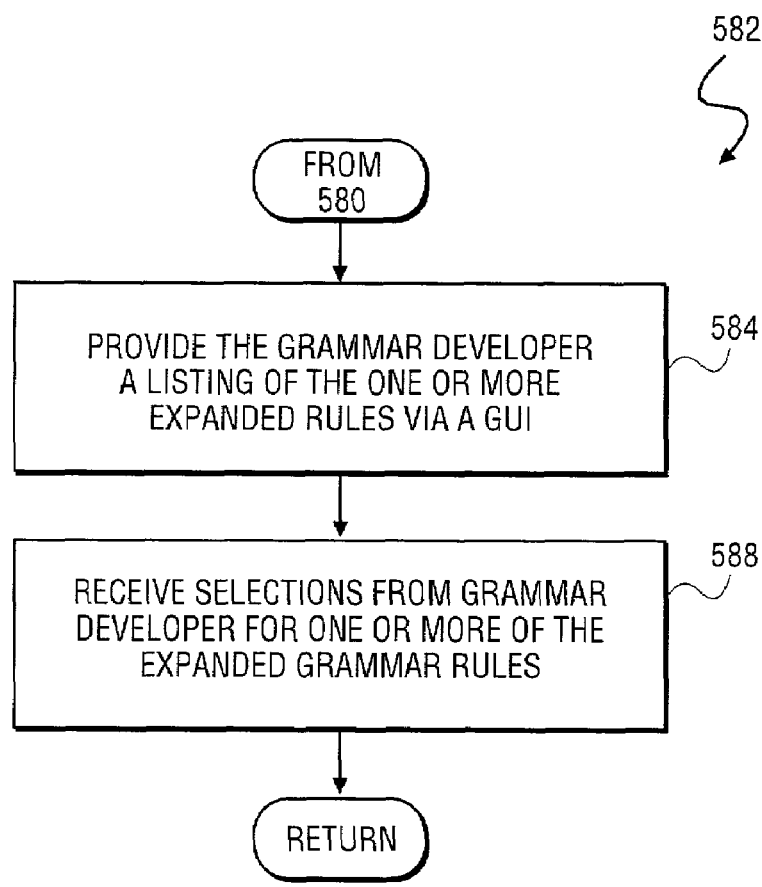
FIG. 12 depicts a flowchart illustrating an additional method for providing expanded grammar rules to a grammar developer in accordance with a further embodiment of the present invention.

Finally, referring to FIG. 12, FIG. 12 depicts an additional method 582 for providing the expanded grammar rules to a grammar developer of process block 580 as depicted in FIG. 6. At process block 584, the grammar developer interface procedures 230 provide the grammar developer a listing of the one or more statement expanded grammar rules via, for example, the grammar developer GUI 270 as depicted in FIG. 4. At process block 586, the grammar developer interface procedures 230 provide the grammar developer a listing of the one or more synonym expanded grammar rules and associated synonym rules via the grammar developer GUI 270 as depicted in FIG. 4.

Finally, at process block 588, the grammar developer interface procedures 230 may receive a selection from the grammar developer for one or more of the Statement expanded grammar rules and one or more of the synonym expanded grammar rules and associated synonym rules. Once received, the final grammar file of process block 600 is formed using the selected statement expanded grammar rules and selected synonym expanded grammar rules, together with corresponding synonym rules as well as the functionality of the grammar rules appearing in the source grammar file. As such, the final grammar rule file may be provided to a speech recognition system, for example as depicted in FIG. 5 to improve speech recognition. However, when the grammar developer fails to select any expanded grammar rules, the final grammar file will only include the functionality of the grammar rules appearing in the source grammar file.

It should be noted that although the grammar developer interface has been described specifically in the context of a system which performs both synonym and statement expansion, those skilled in the art will recognize that a GUI of this form may be used even if the grammar expansion tool does not support both statement expansion and synonym expansion and in fact may be used if other forms of expansion are provided. Additionally, the GUI may not separate the source of expanded grammar rules as the various embodiments have shown.

Alternate Embodiments

Several aspects of one implementation of the grammar expansion tool for providing automated grammar file expansion within a speech recognition system have been described. However, various implementations of the grammar expansion tool provide numerous features including, complementing, supplementing, and/or replacing the features described above. Features can be implemented as part of the stand alone expansion unit or as part of the speech recognition system in different implementations. In addition, the foregoing description, for purposes of explanation, used specific nomenclature to provide a thorough understanding of the invention. However, it will be apparent to one skilled in the an that the specific details are not required in order to practice the invention.

In addition, although an embodiment described herein is directed to a telephony-based speech recognition system, it will be appreciated by those skilled in the art that the teaching of the present invention can be applied to other systems. In fact, all systems for speech recognition utilizing grammar recognition files are within the teachings of the present invention, without departing from the scope and spirit of the present invention. Additionally, systems that provide textual analysis based on grammar files are within the scope and spirit of the present invention. Any system employing grammar files or some analogous structure can make use of this invention, including systems that are concerned with non-natural language applications. The embodiments described above were chosen and described in order to best explain the principles of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to enable automated expansion of a source grammar file. The expansion includes generation of synonym rules and synonym expanded grammar rules in addition to reordering of statement components to form statement expanded grammar rules. A GUI is also provided to allow for easier analysis of the grammar expansion results. Additionally, the grammar file expansion procedures are project aware so that, for example, repeatedly running a given source grammar file through the tool does not force the developer to repeatedly reject or accept certain grammar expansions. Additionally, the source grammar file is kept terse, such that expanded grammar rules and synonym rules are not placed into the source grammar file that the developer is actively editing. As a result, the source file is more readable and maintainable.

Having disclosed exemplary embodiments and the best mode, modifications and variations may be made to the disclosed embodiments while remaining within the scope of the invention as defined by the following claims.

What is claimed is:

1. A method comprising:
   receiving a source grammar file including one or more grammar rules;
   expanding at least one grammar rule within the source grammar file to generate at least one synonym expanded grammar rule;
   reordering one or more components of the synonym expanded grammar rule to form one or more statement expanded grammar rules as at least one modified grammar rule;
   storing the modified grammar rule as an expanded grammar rule if a meaning of the grammar rule from the source grammar file is retained by the modified grammar rule; and
   generating a final grammar file including each grammar rule within the source grammar file as well as one or more modified grammar rules selected by a grammar developer.

2. The method of claim 1, wherein expanding the at least one grammar rule further comprises:
   selecting a grammar rule from the one or more grammar rules within the source grammar file;
   selecting one or more components from the selected grammar statement;
   generating a synonym rule for each of the one or more selected components, each synonym rule including a plurality of synonyms;
   replacing each selected component in the selected grammar rule with a respective synonym rule non-terminal to form a synonym expanded grammar rule; and
   repeating the selecting, selecting, generating and replacing for each grammar rule within the source grammar file to form one or more synonym expanded grammar rules and one or more associated synonym rules as the at least one expanded grammar rule.

3. The method of claim 2, wherein generating an expanded synonym rule further comprises:
   selecting a component from the one or more selected components;
   generating a synonym rule skeleton for the selected component;
   generating a plurality of synonyms for the selected component;
   merging the plurality of synonyms into the synonym rule skeleton to form a synonym rule; and
   repeating the selecting, generating, generating and merging for each of the one or more selected components.

4. The method of claim 1, wherein expanding the at least one grammar rule further comprises:
   selecting a synonym expanded grammar rule from the one or more synonym expanded grammar rules;
   reordering one or more components of the selected synonym expanded grammar rule to form one or more statement expanded grammar rules; and
   repeating the selecting and reordering for each of the one or more synonym expanded grammar rules to form the one or more statement expanded grammar rules as the at least one modified grammar rule.

5. The method of claim 4, wherein reordering one or more components of the selected synonym expanded grammar rule further comprises:
   traversing an internal representation of the selected synonym expanded grammar rule to select a component of the selected synonym expanded grammar rule;

placing the selected component within a position of one or more positions within the selected synonym expanded grammar rule to form an internal statement expanded grammar rule;
determining whether the internal statement expanded grammar rule retains a meaning of the selected synonym expanded grammar rule;
when the internal statement expanded grammar rule retains a meaning of the selected synonym expanded grammar rule, storing the internal statement expanded grammar rule as a statement expanded grammar rule;
repeating the placing, determining and storing for each of one or more positions within the selected synonym expanded grammar rule; and
repeating the traversing, placing, determining, storing and repeating for each component of the selected synonym expanded grammar rule in order to form the one or more statement expanded grammar rules as the at least one modified grammar rules.

6. The method of claim 4, wherein reordering one or more components of the selected synonym expanded grammar rule further comprises:
traversing an internal representation of the selected grammar rule to select one or more components of the selected synonym expanded grammar rule according to a reordering rule;
placing each of the selected components within a respective position of one or more positions within the selected synonym expanded grammar rule, according to the reordering rule, to form a statement expanded grammar rule; and
repeating the traversing and placing for each component of the selected statement expanded grammar rule in order to form the one or more statement expanded grammar rules as the at least one modified grammar rules.

7. The method of claim 1, wherein expanding each grammar rule further comprises:
selecting a grammar rule from the one or more grammar rules within the source grammar file;
reordering one or more components of the selected grammar rule to form one or more statement expanded grammar rules; and
repeating the selecting and reordering for each of the one or more grammar rules within the source grammar file to form one or more statement expanded grammar rules as the at least one modified grammar rule.

8. The method of claim 7, wherein reordering one or more components of the selected grammar rule further comprises:
traversing an internal representation of the selected grammar rule to select one or more components of the selected grammar rule according to a reordering rule;
placing the selected components within a respective position of one or more positions within the selected grammar rule, according to the reordering rule, to form a statement expanded grammar rule; and
repeating the traversing and placing for each of one or more reordering rules to form the one or more statement expanded grammar rules as the at least one modified grammar rule.

9. The method of claim 7, wherein reordering one or more components of the selected grammar rule further comprises:
traversing an internal representation of the selected grammar rule to select a component of the selected grammar rule;

placing the selected component within a position of one or more positions within the selected grammar rule to form an internal statement expanded grammar rule;
determining whether the internal statement expanded grammar rule retains a meaning of the selected grammar rule;
when the internal statement expanded grammar rule retains a meaning of the selected grammar rule, storing the internal statement expanded grammar rule as a statement expanded grammar rule;
repeating the placing, determining and storing for each of one or more positions within the selected grammar rule; and
repeating the traversing, placing, determining, storing and repeating for each component of the selected grammar rule in order to form the one or more statement expanded grammar rules as the at least one modified grammar rule.

10. The method of claim 1, further comprising:
providing the expanded grammar rule to a grammar developer.

11. The method of claim 10, further comprising:
receiving a selection from the grammar developer for the expanded grammar rules; and
generating a final grammar file including functionality of each grammar rule within the source grammar file as well as one or more expanded grammar rules selected by the grammar developer from the at least one expanded grammar rule.

12. The method of claim 10, wherein the expanded grammar rule include one of one or more statement expanded grammar rules, one or more synonym expanded grammar rules and one or more associated synonym rules.

13. The method of claim 1, further comprising:
generating a final grammar file including functionality of each grammar rule within the source grammar file as well as the expanded grammar rule.

14. A computer readable storage medium encoded with computer executable instructions, which when executed perform a method comprising:
receiving a source grammar file including one or more grammar rules;
expanding at least one grammar rule within the source grammar file to generate at least one synonym expanded grammar rule;
reordering one or more components of the synonym expanded grammar rule to form one or more statement expanded grammar rules as at least one modified grammar rule; and
storing the modified graniniar as an expanded grammar rule if a meaning of the grammar rule from source grammar file is retained by the modified grammar rule.

15. The computer readable storage medium of claim 14, wherein expanding the grammar rule further comprises:
selecting a grammar rule from the one or more grammar rules within the source grammar file;
selecting one or more components from the selected grammar rule;
generating a synonym rule for each of the one or more selected components, each synonym rule including a plurality of synonyms;
replacing each selected component in the selected grammar rule with a respective synonym rule non-terminal of a respective synonym rule to form a synonym expanded grammar rule; and
repeating the selecting, selecting, generating and replacing for each grammar rule within the source grammar file to form one or more synonym expanded grammar rules and one or more associated synonym rules as the at least one modified grammar rule.

16. The computer readable storage medium of claim 15, generating a synonym rule expand further comprises:
   selecting a component from the one or more selected components;
   generating a synonym rule skeleton for the selected component;
   generating a plurality of synonyms for the selected component;
   merging the plurality of synonyms into the synonym rule skeleton to form a synonym rule; and
   repeating the selecting, generating, generating and forming for each of the one or more selected components.

17. The computer readable storage medium of claim 14, wherein expanding the at least one grammar rule further comprises:
   selecting a synonym expanded grammar rule from the one or more synonym expanded grammar rules;
   reordering one or more components of the selected synonym expanded grammar rule to form one or more statement expanded grammar rules; and
   repeating the selecting and reordering for each of the one or more synonym expanded grammar rules to form the one or more statement expanded grammar rules as the at least one modified grammar rule.

18. The computer readable storage medium of claim 17, wherein reordering one or more components of the selected synonym expanded grammar rule further comprises:
   traversing an internal representation of the selected synonym expanded grammar rule to select a component of the selected synonym expanded grammar rule;
   placing the selected component within a position of one or more positions within the selected synonym expanded grammar rule to form an internal statement expanded grammar rule;
   determining whether the internal statement expanded grammar rule retains a meaning of the selected synonym expanded grammar rule;
   when the internal statement expanded grammar rule retains a meaning of the selected synonym expanded grammar rule, storing the internal statement expanded grammar rule as a statement expanded grammar rule;
   repeating the placing, determining and storing for each of one or more positions within the selected grammar rule; and
   repeating the traversing, placing, determining, storing and repeating for each component of the selected synonym expanded grammar rule in order to form the one or more statement expanded grammar rules as the at least one modified grammar rule.

19. The computer readable storage method of claim 17, wherein reordering one or more components of the selected grammar rule further comprises:
   traversing an internal representation of the selected synonym expanded grammar rule to select one or more components of the selected synonym expanded grammar rule according to a reordering rule;
   placing each of the selected components within a respective position of one or more positions within the selected synonym expanded grammar rule, according to the reordering rule, to form a statement expanded grammar rule; and
   repeating the traversing and placing for each of one or more reordering rules to form the one or more statement expanded grammar rules as the at least one modified grammar rule.

20. The computer readable storage medium of claim 14, wherein expanding each grammar rule further includes:
   selecting a grammar rule from one or more grammar rules within the source grammar file;
   reordering one or more components of the selected grammar rule to form one or more statement expanded grammar rules; and
   repeating the selecting and reordering for each of the one or more grammar rules within the source grammar file to form the one or more statement expanded grammar rules as the at least one modified grammar rule.

21. The computer readable storage medium of claim 20, wherein reordering one or more components of the grammar rule further comprises:
   traversing an internal representation of the selected grammar rule to select a component of the selected grammar rule;
   placing the selected component within a position of one or more positions within the selected grammar rule to form an internal statement expanded grammar rule;
   determining whether the internal statement expanded grammar rule retains a meaning of the selected grammar rule;
   when the internal statement expanded grammar rule retains a meaning of the selected grammar rule, storing the internal statement expanded grammar rule as a statement expanded grammar rule;
   repeating the placing, determining and storing for each of one or more positions within the selected grammar rule; and
   repeating the traversing, placing, determining, storing and repeating for each component of the selected grammar rule in order to form the one or more statement expanded grammar rules as the at least one modified grammar rule.

22. The computer readable storage medium of claim 20, wherein reordering one or more components of the selected grammar rule further comprises:
   traversing an internal representation of the selected grammar rule to select one or more components of the selected grammar rule according to a reordering rule;
   placing the selected component within a respective position of one or more positions within the selected grammar rule, according to the reordering rule, to form a statement expanded grammar rule; and
   repeating the traversing and placing for each of one or more reordering rules to form the one or more statement expanded grammar rules as the at least one modified grammar rule.

23. The computer readable storage medium of claim 14, further comprising:
   providing the modified grammar rule to a grammar developer.

24. The computer readable storage medium of claim 23, further comprising:
   receiving a selection from the grammar developer for one or more of the at least one expanded grammar rule; and
   generating a final grammar file including functionality of each grammar rule within the source grammar file as well as the one or more expanded grammar rules selected by the grammar developer from the at least one modified grammar rule.

25. The computer readable storage medium of claim 23, wherein the at least one expanded grammar rule include one of one or more statement expanded grammar rules, one or more synonym expanded grammar rules and one or more associated synonym rules.

26. The computer readable storage medium of claim 14, further comprising:
  generating a final grammar file including functionality of each grammar rule within the source grammar file as well as the at least one modified grammar rule.

27. An apparatus, comprising:
  a processor having circuitry to execute instructions;
  grammar file expansion logic to reorder one or more components of a synonym expanded grammar rule to form one or more statement expanded grammar rules as at least one modified grammar rule;
  a user interface coupled to the processor, the user interface to provide the modified grammar rule to a grammar developer, and to receive a selection from the grammar developer for one or more of the modified grammar rules;
  a display device to display the expanded modified rules to the grammar developer;
  a storage device coupled to the processor, having sequences of instructions stored therein, which when executed by the processor cause the processor to:
  generate a final grammar file including each grammar rule within the source grammar file as well as one or more modified grammar rules selected by the grammar developer.

28. The apparatus of claim 27, wherein prior to the instruction to generate a final grammar file, the processor is further caused to:
  receive a source grammar file;
  expand one or more grammar rules within the source grammar file to generate one or more expanded grammar rules; and
  provide the one or more expanded grammar rules to the grammar developer.

29. The apparatus of claim 27, wherein the processor is further caused to:
  provide the final grammar file to a speech recognition engine of a speech recognition system.

30. A system comprising:
  a speech interface to receive digitized speech data from a user;
  a speech recognition engine to process the speech data to determine a recognized phrase as the speech data provided by the user utilizing an expanded grammar file; and
  a processor having a capability to:
    expand one or more grammar rules within the source grammar file to generate one or more expanded grammar rules;
    reorder one or more components of the selected grammar rule to form one or more statement expanded grammar rules as at least one modified grammar rule;
    provide the one or more modified grammar rules to the grammar developer;
    generate the expanded grammar file including each grammar rule within a source grammar file as well as one or more expanded grammar rules selected by the grammar developer; and
    generate a final grammar file including each grammar rule within the source grammar file as well as one or more modified grammar rules selected by the grammar developer.

31. The system of claim 30, wherein speech interface further comprises:
  an interface to receive analog speech data from the user; and
  an analog-to-digital conversion unit to convert the analog speech data to a digital format as the digitized speech data.

* * * * *

UNITED STATES PATENT AND TRADEMARK OFFICE
CERTIFICATE OF CORRECTION

PATENT NO. : 7,257,529 B2
APPLICATION NO. : 09/951338
DATED : August 14, 2007
INVENTOR(S) : Bennett Page 1 of 1

It is certified that error appears in the above-identified patent and that said Letters Patent is hereby corrected as shown below:

In column 4, at line 49, delete "arid" and insert --and--.

In column 8, at line 40, delete "graniniar" and insert --grammar--.

In column 12, at line 39, delete "Statement" and insert --statement--.

In column 13, at line 11, delete "an" and insert --art--.

In column 15, at line 20, delete "rules" and insert --rule--.

In column 15, at line 37, delete "rules" and insert --rule--.

In column 16, at line 50, delete "graniniar" and insert --grammar--.

Signed and Sealed this

Thirteenth Day of May, 2008

JON W. DUDAS
*Director of the United States Patent and Trademark Office*